(12) United States Patent
Zhao et al.

(10) Patent No.: US 10,450,088 B2
(45) Date of Patent: Oct. 22, 2019

(54) STOP DEVICE AND AERIAL VEHICLE USING THE SAME

(71) Applicant: SZ DJI OSMO TECHNOLOGY CO., LTD., Shenzhen (CN)

(72) Inventors: Tao Zhao, Shenzhen (CN); Peng Wang, Shenzhen (CN); Lixue Ren, Shenzhen (CN); Xifeng Zhao, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/207,628

(22) Filed: Dec. 3, 2018

(65) Prior Publication Data

US 2019/0100329 A1    Apr. 4, 2019

Related U.S. Application Data

(63) Continuation of application No. 15/399,197, filed on Jan. 5, 2017, now Pat. No. 10,183,762, which is a
(Continued)

(51) Int. Cl.
*B64D 47/08* (2006.01)
*F16M 13/04* (2006.01)
(Continued)

(52) U.S. Cl.
CPC ............ *B64D 47/08* (2013.01); *B64C 39/024* (2013.01); *F16M 11/08* (2013.01); *F16M 11/18* (2013.01);
(Continued)

(58) Field of Classification Search
CPC .... B64D 47/08; G03B 15/006; G03B 17/561; G03B 17/563; G05G 5/04; G05G 5/06;
(Continued)

(56) References Cited

U.S. PATENT DOCUMENTS

| 4,111,499 A | 9/1978 | McCloskey |
| 7,189,023 B2 | 3/2007 | Kang et al. |

(Continued)

FOREIGN PATENT DOCUMENTS

| CN | 2746422 Y | 12/2005 |
| CN | 2746423 Y | 12/2005 |

(Continued)

OTHER PUBLICATIONS

European Patent Office (EPO) The Extended European Search Report for 14897236.7 dated Jul. 3, 2017 6 pages.
(Continued)

*Primary Examiner* — Adam D Rogers
(74) *Attorney, Agent, or Firm* — Anova Law Group, PLLC

(57) ABSTRACT

A stop device includes a motor rotor assembly including a rotating shaft, a first shift lever fixedly connected to the rotating shaft and including a first shifting part configured to rotate around an axis of the rotating shaft to form a first motion trajectory, and a second shift lever rotatably connected to the first shift lever and including a second shifting part partially within the first motion trajectory. The first shifting part is configured to drive the second shifting part to rotate around the axis of the rotating shaft to form a second motion trajectory. The stop device further includes a motor stator assembly sleeved on the rotating shaft and rotatably connected with the rotating shaft. The motor stator assembly includes a stopping boss located on a periphery of the first motion trajectory and partially within the second motion trajectory.

15 Claims, 8 Drawing Sheets

Related U.S. Application Data continuation of application No. PCT/CN2014/081766, filed on Jul. 7, 2014.

(51) Int. Cl.

| | | |
|---|---|---|
| *F16M 11/04* | (2006.01) | |
| *F16M 11/18* | (2006.01) | |
| *F16M 13/02* | (2006.01) | |
| *G03B 15/00* | (2006.01) | |
| *B64C 39/02* | (2006.01) | |
| *F16M 11/08* | (2006.01) | |
| *F16M 11/20* | (2006.01) | |

(52) U.S. Cl.
CPC ........ *F16M 11/2057* (2013.01); *F16M 13/02* (2013.01); *G03B 15/006* (2013.01); *B64C 2201/127* (2013.01)

(58) Field of Classification Search
CPC . B64C 39/024; B64C 2201/127; F16M 11/06; F16M 11/08; F16M 11/10; F16M 11/123; F16M 11/18; F16M 11/2057; F16M 11/2071; F16M 13/02; F16M 13/022

See application file for complete search history.

(56) References Cited

U.S. PATENT DOCUMENTS

| | | |
|---|---|---|
| 9,280,038 B1 | 3/2016 | Pan et al. |
| 9,781,313 B2 | 10/2017 | Pan et al. |
| 9,890,900 B2 | 2/2018 | Zhao et al. |
| 10,209,733 B2 * | 2/2019 | Zhao ................. G05G 5/04 |
| 2006/0044089 A1 | 3/2006 | Kang et al. |
| 2017/0114954 A1 | 4/2017 | Zhao et al. |
| 2017/0176840 A1 | 6/2017 | Zhou et al. |
| 2017/0227831 A1 | 8/2017 | Tang et al. |
| 2018/0299750 A1 * | 10/2018 | Vuillet ............... G03B 17/561 |

FOREIGN PATENT DOCUMENTS

| | | |
|---|---|---|
| CN | 2785318 Y | 5/2006 |
| CN | 101309566 A | 11/2008 |
| CN | 201207143 Y | 3/2009 |
| CN | 201866199 U | 6/2011 |
| CN | 202444548 U | 9/2012 |
| CN | 202453629 U | 9/2012 |
| CN | 103176481 A | 6/2013 |
| CN | 203549327 U | 4/2014 |
| CN | 103883852 A | 6/2014 |
| EP | 1867911 A1 | 12/2007 |
| JP | 2010074477 A | 4/2010 |

OTHER PUBLICATIONS

The World Intellectual Property Organization (WIPO) International Search Report for PCT/CN2014/081766 dated Jan. 4, 2015 p. 1-8.
Machine translation of CN103176481A obtained on May 7, 2018. (Year:2018).

* cited by examiner

STOP DEVICE AND AERIAL VEHICLE USING THE SAME

CROSS-REFERENCE TO RELATED APPLICATION

This is a continuation application of application Ser. No. 15/399,197, filed on Jan. 5, 2017, which is a continuation application of International Application No. PCT/CN2014/081766, filed on Jul. 7, 2014, the entire contents of both of which are incorporated herein by reference.

TECHNICAL FIELD

The present disclosure relates to a field of aerial vehicles, and particularly to a stop device and an aerial vehicle using the same.

BACKGROUND

In the field of aerial photography, a single-revolution limited rotation structure that limits a rotation to one revolution is often utilized to obtain a wide range of shooting angle. However, this structure suffers from a drawback that it may not be able to make a full 360° rotation due to the stopping action of a stopper, leading to an insufficient shooting angle. In order to address this issue, an indefinite full-revolution rotation structure may be utilized in the prior art; however, unlimited rotations of this structure due to the absence of the stopping action of the stop device may easily cause flexible printed circuit board (FPC) wiring to break, thereby reducing service life of the FPC.

SUMMARY

An object of the present disclosure is to provide a stop device having a stopping action with a rotation angle greater than 360° and less than 720°, and an aerial vehicle using the same.

In order to address the aforementioned technical problem, the present disclosure provides a stop device, which may comprise a motor rotor assembly including a rotating shaft, a first shift lever fixedly connected to the rotating shaft and comprising a first shifting part configured to rotate around an axis of the rotating shaft to form a first motion trajectory, and a second shift lever rotatably connected to the first shift lever and comprising a second shifting part partially within the first motion trajectory. The first shifting part is configured to drive the second shifting part to rotate around the axis of the rotating shaft to form a second motion trajectory. The stop device may further comprise a motor stator assembly sleeved on the rotating shaft and rotatably connected with the rotating shaft. The motor stator assembly comprises a stopping boss located on a periphery of the first motion trajectory and partially within the second motion trajectory. The first shift lever may rotate to drive the first shift lever to rotate for a total rotation angle greater than 360° and less than 720°.

Optionally, the rotating shaft is configured to drive the first shift lever and the second shift lever to rotate in a first direction until the second shifting part is brought into contact with the stopping boss, drive the first shift lever to rotate in a second direction opposite to the first direction until the first shifting part is brought into contact with the second shifting part, and drive, after the first shifting part is brought into contact with the second shifting part, the first shift lever and the second shift lever to rotate in the second direction.

Optionally, the rotating shaft is configured to drive the first shift lever and the second shift lever to rotate in the first direction until the second shifting part is brought into contact with the stopping boss, drive the first shift lever to continue to rotate in the first direction until the first shifting part comes into contact with the second shifting part, and rotate in the second direction opposite to the first direction to drive the first shift lever and the second shift lever to rotate in the second direction.

Optionally, the motor stator assembly may comprise a receiving groove and the rotating shaft may pass through the receiving groove, and each of the first shift lever, the second shift lever and the stopping boss may be located within the receiving groove.

Optionally, a distance between the first shifting part and the axis of the rotating shaft may be less than a distance between the stopping boss and the axis of the rotating shaft, and a distance between the second shifting part and the axis of the rotating shaft may be greater than the distance between the stopping boss and the axis of the rotating shaft.

Optionally, the motor rotor assembly may comprise a housing, and the rotating shaft may be arranged at a center of the housing.

Optionally, the rotating shaft may comprise a first connecting part arranged at the center of the housing and a second connecting part arranged on the first connecting part. The second connecting part includes a first rotation stopping position. The first shift lever may comprise a first rotating part arranged on the second connecting part. The first rotating part includes a second rotation stopping position. The first rotation stopping position and the second rotation stopping position may fit with each other to restrict the first rotating part from rotating relative to the rotating shaft.

Optionally, the first rotation stopping position may be a first tangential section arranged on the second connecting part, and the second rotation stopping position may be a second tangential section arranged on the first rotating part.

Optionally, the stop device may further comprise a locking nut, and the rotating shaft may further comprise a third connecting part on which the locking nut may be threadedly connected.

Optionally, the stop device may further comprise a sleeve member connected between the first shift lever and the second shift lever to reduce a rotational friction between the first shift lever and the second shift lever.

Optionally, the sleeve member may be a copper sleeve and the sleeve member may be fixedly arranged on the rotating shaft. An end face of the sleeve member may be against an end face of the first rotating part, and the second shift lever may be sleeved on a periphery of the sleeve member and rotate relative to the sleeve member.

Accordingly, the present disclosure further provides an aerial vehicle which may comprise the aforementioned stop device and a payload, where the payload may be rotatably connected with the stop device, and the stop device may drive the payload to rotate.

Optionally, the payload may be a camera assembly.

The stop device according to the present disclosure may be provided with the rotating shaft, the first shift lever and the second shift lever to drive the rotation of the first shift lever and the second shift lever by the rotating shaft, and may be provided with the stopping boss such that the rotation of the first shift lever and the second shift lever may be stopped due to the stopping action of the stopping boss.

The first shift lever may then rotate in a reverse direction, without the second shift lever rotating along, for about a full revolution until the first shifting part comes into contact with the second shifting part again. After that, the first and second shift levers can rotate together in the reverse direction for about one full revolution until the second shifting part comes into contact with the stopping boss again. In some other embodiments, the rotation of the second shift lever may be stopped due to the stopping action of the stopping boss, while the first shift lever may continue to rotate until the first shifting part comes into contact with the second shifting part and stops rotating. As such, the first shift lever can rotate by an angle greater than 360° and less than 720°.

BRIEF DESCRIPTION OF THE DRAWINGS

Drawings to which the reference is made in various embodiments of the present disclosure will be briefly described below to clearly illustrate the technical solution as provided by the present disclosure. It is apparent that the drawings described below are merely illustrative of some of the embodiments of the disclosure, and those ordinarily skilled in the art can further derive other drawings from the drawings below without any inventive effort. In the drawings.

DETAILED DESCRIPTION OF THE EMBODIMENTS

The technical solutions according to the embodiments of the present disclosure will be clearly and fully described below with reference to the drawings.

Figure 1:
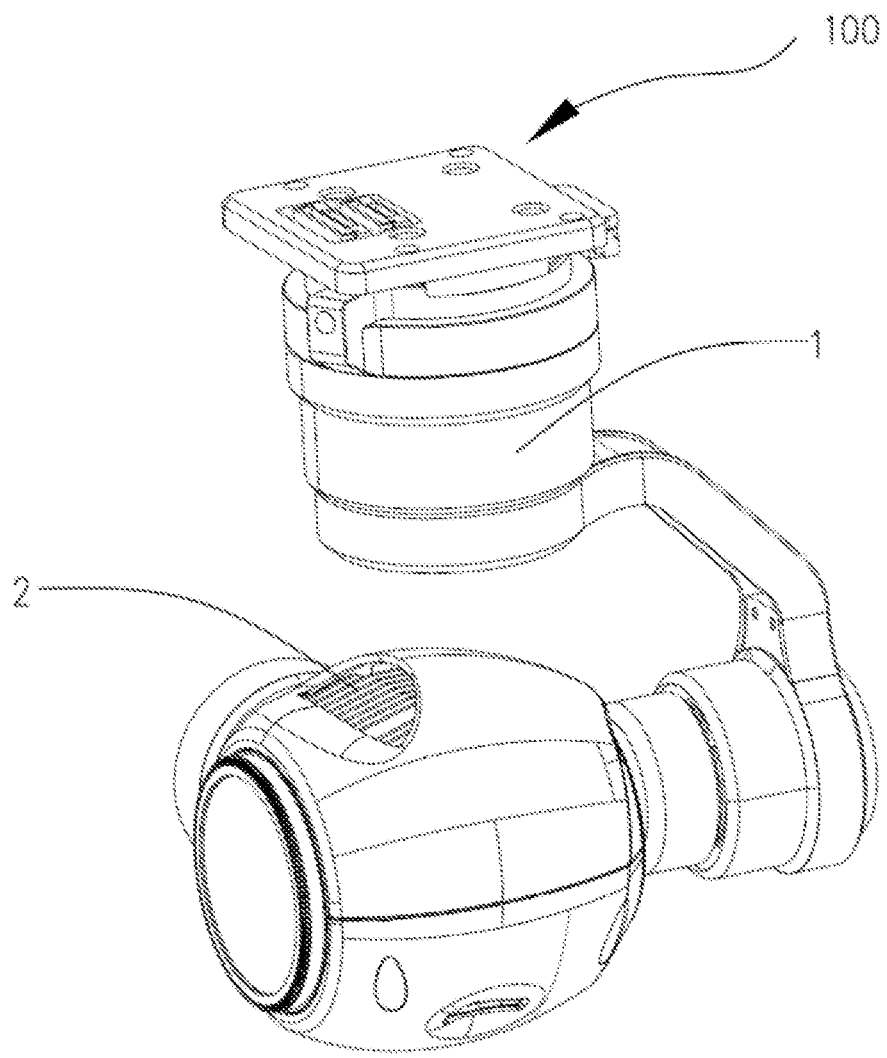
FIG. 1 is a schematic diagram of an aerial vehicle provided by the embodiments of the present disclosure.
Figure 2:
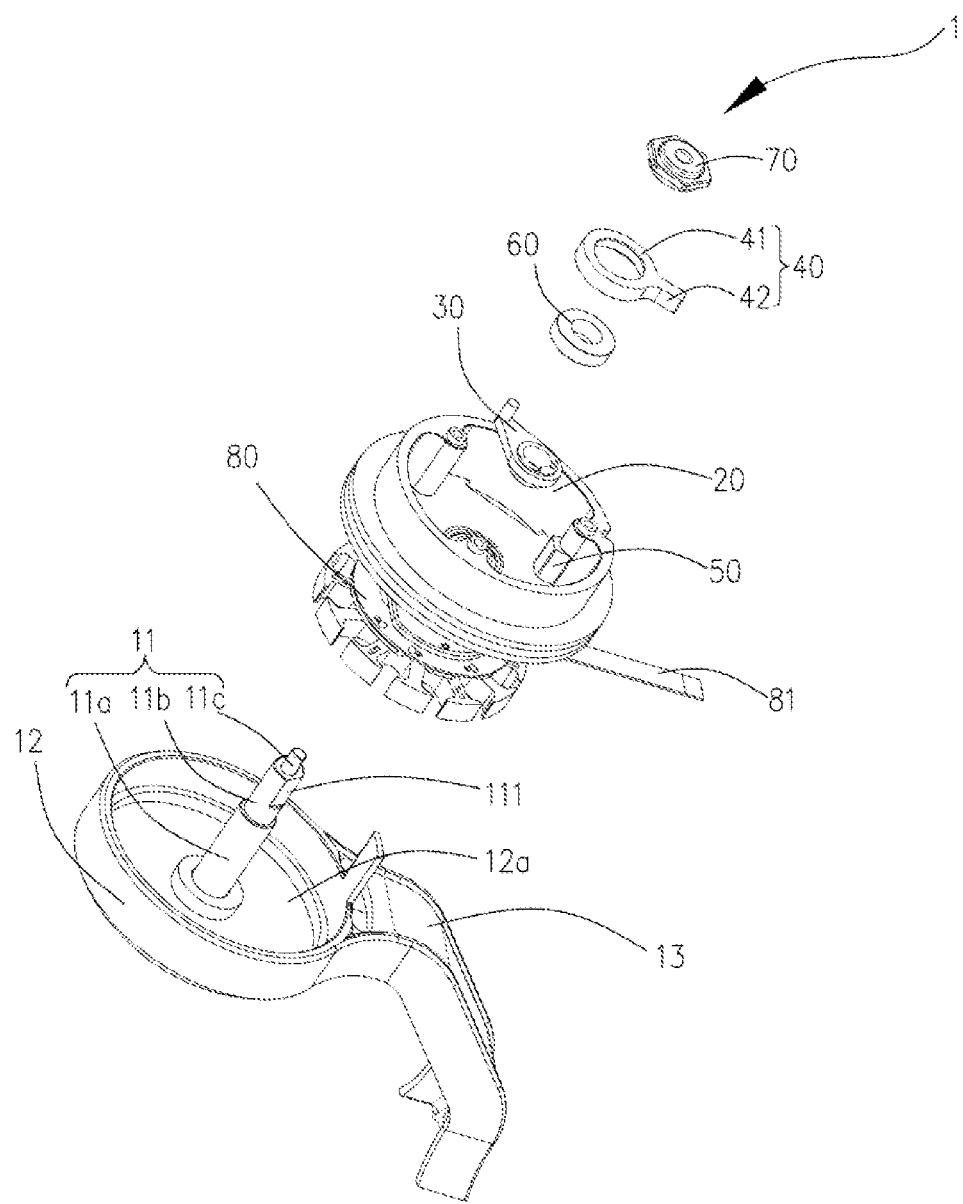
FIG. 2 is a schematic diagram of a stop device provided by the embodiments of the present disclosure.
Figure 3:
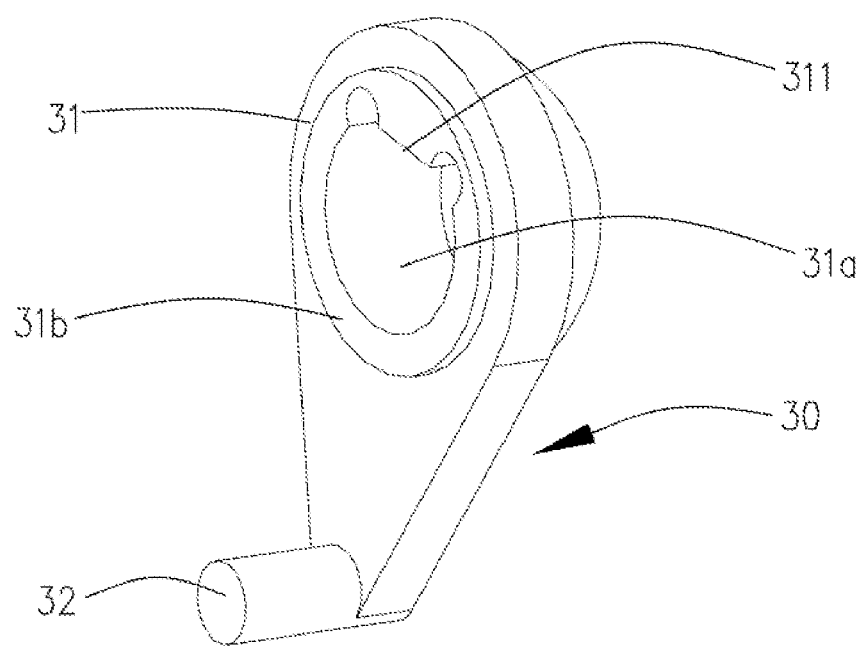
FIG. 3 is a schematic diagram of a first shift lever provided by the embodiments of the present disclosure.
Figure 4:
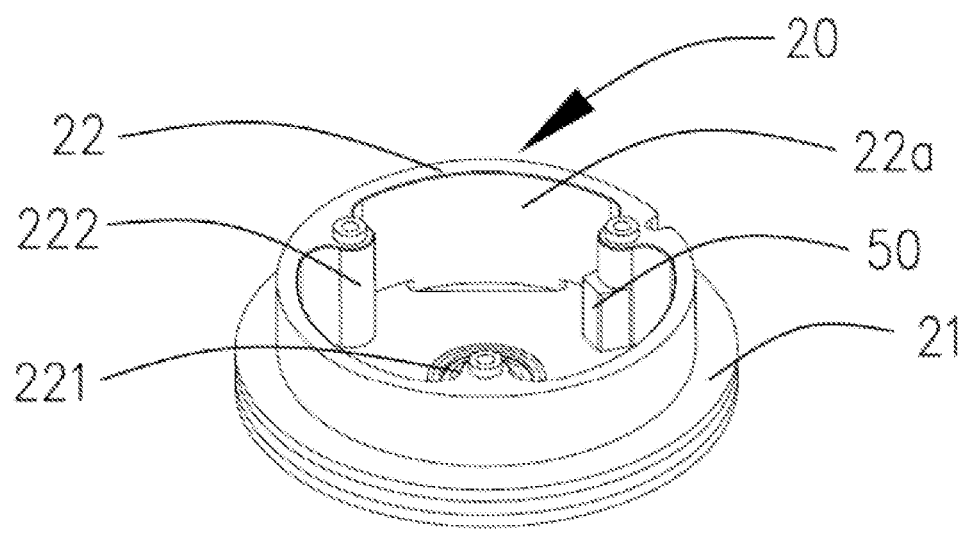
FIG. 4 is a schematic diagram of a motor stator assembly provided by the embodiments of the present disclosure.
Figure 5:
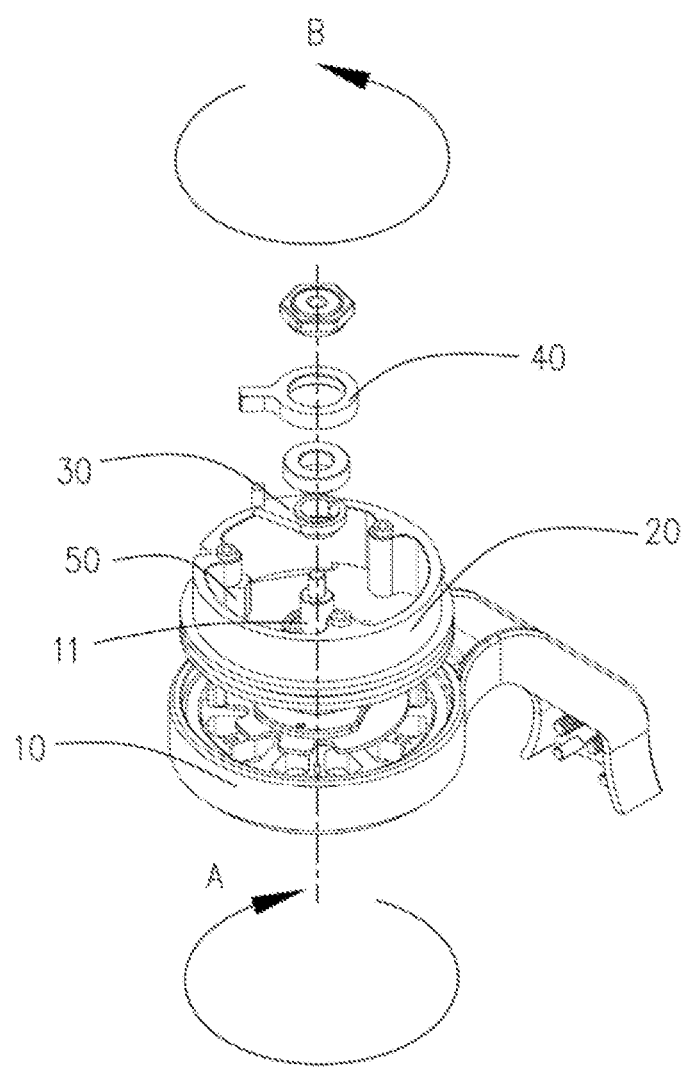
FIG. 5 is an assembly diagram of the stop device provided by the embodiments of the disclosure.

Referring to FIG. 1, there is illustrated an aerial vehicle 100 according to the embodiments of the present disclosure. The aerial vehicle 100 may comprise a rotatable stop device 1 and a payload 2 rotatably connected on the stop device 1.

Referring to FIGS. 2 to 5, the stop device 1 may comprise a motor rotor assembly 10, a motor stator assembly 20, a first shift lever 30, a second shift lever 40, a boss 50 and a sleeve member 60. The motor rotor assembly 10 may comprise a rotating shaft 11. The motor stator assembly 20 may be sleeved on the rotating shaft 11. The rotating shaft 11 may be capable of rotating relative to the motor stator assembly 20. The first shift lever 30 may be fixedly connected to the rotating shaft 11, and the rotating shaft 11 may drive the first shift lever 30 to rotate. The second shift lever 40 may be rotatably connected to the first shift lever 30, and the boss 50 may be arranged in the motor stator assembly 20, and the sleeve member 60 may be connected between the first shift lever and the second shift lever.

The motor rotor assembly 10 may further comprise a housing 12, and the rotating shaft 11 may be arranged at the center of the housing 12. In particular, the housing 12 may be provided with a receiving cavity 12a, and the rotating shaft 11 may be arranged at the center of the receiving cavity 12a. The motor rotor assembly 10 may further comprise a rotating rod 13 arranged on a periphery of the housing 12. In some embodiments, the rotating rod 13 may be formed integrally with the housing 12 for easy manufacture. Of course, in other embodiments, the rotating rod 13 may also be fixedly arranged on the housing 12 through other means, such as welding or screw connections. The payload 2 may be rotatably connected to the rotating rod 13.

In some embodiments, the rotating shaft 11 may be a stepped shaft to achieve multistage connection. The rotating shaft 11 may comprise a first connecting part 11a, a second connecting part 11b and a third connecting part 11c. The first connecting part 11a may be arranged at the center of the receiving cavity 12a. The second connecting part 11b may be arranged on the first connecting part 11a, and a first rotation stopping position 111 may be arranged on the second connecting part 11b. In particular, the first rotation stopping position 111 may be a first tangential section arranged on the second connecting part 11b. The third connecting part 11c may be arranged on the second connecting part 11b, and may be provided with external thread (not shown). That is, the second connecting part 11b may be arranged between the first connecting part 11a and the third connecting part 11c.

The motor stator assembly 20 may comprise a bearing plate 21 and a base 22, and the bearing plate 21 may be threadedly connected with the housing 12 for easy disassembly. The base 22 may be fixedly arranged on the bearing plate 21. In some embodiments, the base 22 may be a cylindrical structure. The base 22 may be provided with a receiving groove 22a, and the receiving groove 22a may be a circular groove. A through-hole 221 penetrating the bearing plate 21 may be provided at the center of the receiving groove 22a, and the rotating shaft 11 may pass through the through-hole 221. Three studs 222 may be provided on a wall of the receiving groove 22a, such that they are placed in a triangular arrangement around the center of the receiving groove 22a. The three studs 222 can be utilized to facilitate fixed connections of the base 22 with other components.

The first shift lever 30 may be located in the receiving groove 22a and fixedly connected to the rotating shaft 11, so that the rotating shaft 11 may drive the first shift lever 30 to rotate in a first direction A, thereby allowing the first shift lever 30 to rotate by a total angle greater than 360° and less than 720°. In particular, the first shift lever 30 may comprise a first rotating part 31 and a first shifting part 32. The first rotating part 31 may be arranged on the rotating shaft 11, and the rotating shaft 11 may drive the first rotating part 31 to rotate. The first shifting part 32 may be arranged on the first rotating part 31.

The first rotating part 31 may be a conical structure. The first rotating part 31 may be arranged on the second connecting part 11b. In particular, a connecting hole 31a may be provided at the center of the first rotating part 31, and the connecting hole 31a may be arranged such that the second connecting part 11b passes therethrough. More particularly, the connecting hole 31a may be provided with a second rotation stopping position 311, which may fit with the first rotation stopping position 111 to restrict the rotation of the first rotating part 31a around the rotating shaft 11. Furthermore, the second rotation stopping position 311 may be a second tangential section arranged on the connecting hole 31a and may be against the first rotation stopping position 111 such that the connecting hole 31a may be in clearance fit with the second connecting part 11b. Moreover, the first rotation stopping position 111 and the second rotation stopping position 311 may further achieve transfer of an axial torque such that the first rotating part 31 can be kept in synchronous rotation with the rotating shaft 11.

Of course, in other embodiments, the first rotation stopping position 111 and the second rotation stopping position 311 can be arranged otherwise, for example, the first rotation stopping position 111 may be a recess or a boss provided on the second connecting part 11b, and then the second rotation stopping position 311 may be a boss or a recess provided on the first rotating part 31.

Moreover, in other embodiments, the first rotating part 31 may also be in interference fit with the rotating shaft 11, so as to achieve synchronous rotation of the first rotating part 31 and the rotating shaft 11.

In some embodiments, the first rotating part 31 may be further provided with a cylindrical boss 31b; the cylindrical boss 31b may be coaxial with the connecting hole 31a, and the connecting hole 31b may penetrate through the cylindrical boss 31b.

The first shifting part 32 may be arranged on the first rotating part 31. In some embodiments, the first shifting part 32 may be a cylindrical structure arranged on the first rotating part 31. Of course, in other embodiments, the first shifting part 32 may also be another structure, such as a rod-shaped structure.

The second shift lever 40 may be arranged in the receiving groove 22a, and sleeved on the first shift lever 30. In particular, the second shift lever 40 may comprise a second rotating part 41 and a second shifting part 42. The second rotating part 41 may be sleeved on the first rotating part 31. More particularly, the second rotating part 41 may be sleeved on the cylindrical boss 31b. The second rotating part 41 may be a ring structure and in clearance fit with the cylindrical boss 31b so that the first rotating part 31 will not drive the second rotating part 41 to rotate along with it when the first rotating part 31 rotates.

The second shifting part 42 may be arranged on the second rotating part 41. In particular, the second shifting part 42 may be a rod-shaped structure arranged on the second rotating part 41, and may be formed integrally with the second rotating part 41 for easy manufacture.

Figure 6:
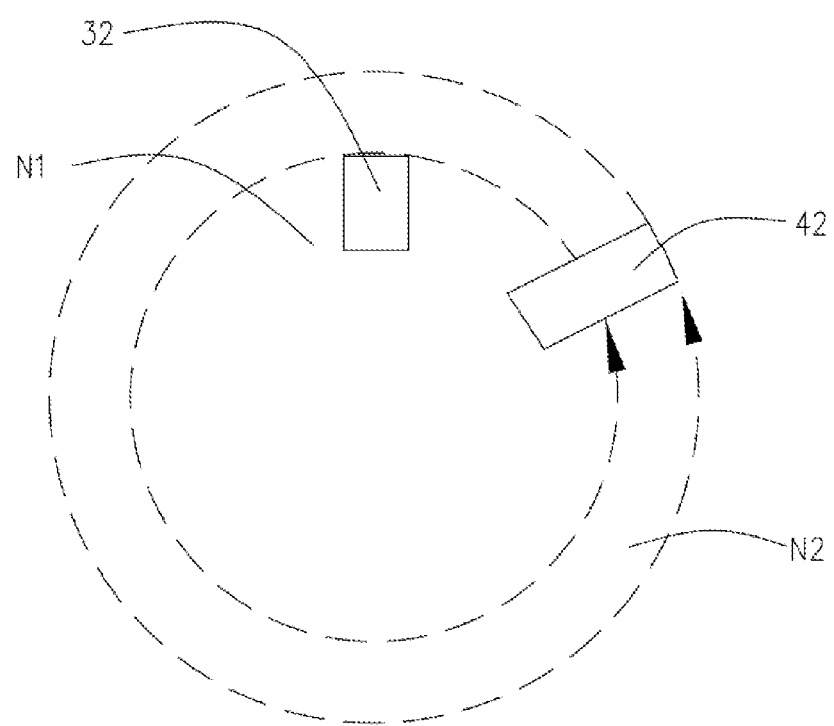
FIG. 6 is a schematic diagram of a first motion trajectory provided by the embodiments of the present disclosure.

While the rotating shaft 11 is rotating, the first shifting part 32 may rotate around the axis of the rotating shaft 11 to form a first motion trajectory N1. The second shifting part 42 may be partially within the first motion trajectory N1, and the first shifting part 32 may be capable of driving the second shifting part 42 to rotate around the axis of the rotating shaft 11 to form a second motion trajectory N2 (as shown in FIG. 6). In some embodiments, the first motion trajectory N1 may be a circular trajectory. That is, the first shifting part 32 may rotate around the axis of the rotating shaft 11 by one revolution. Of course, in other embodiments, the first motion trajectory N1 can also be an arc.

In particular, when the rotating shaft 11 drives the first shift lever 30 to rotate such that the first shifting part 32 comes into contact with the second shifting part 42, the first shifting part 32 exerts on the second shifting part 42 a pushing force, under the effect of which the second shift lever 40 may by driven by the first shift lever 30 to rotate in the direction of the rotation of the rotating shaft 11.

The stop device 1 may further comprise a sleeve member 60 connected between the first shift lever 30 and the second shift lever 40 to reduce a rotational friction between the first shift lever 30 and the second shift lever 40. In some embodiments, the sleeve member 60 may be a copper sleeve, the sleeve member 60 may be fixedly connected to the rotating shaft 11 and may be against the first shift lever 30. The second shift lever 40 may be sleeved on a periphery of the sleeve member 60 and rotate relative to the periphery, thus reducing the rotational friction between the first shift lever 30 and the second shift lever 40. In particular, the sleeve member 60 may be sleeved on the third connecting part 11c, and an end face of the sleeve member 60 may be against an end face of the cylindrical boss 31b. The second rotating part 41 may be sleeved on the periphery of the sleeve member 60 and may rotate relative to the sleeve member 60 so that the sleeve member 60 may be utilized to reduce the rotational friction between the first shift lever 30 and the second shift lever 40 when the first shift lever 30 drives the second shift lever 40 to rotate. Of course, in other embodiments, the sleeve member 60 may also be a bearing or a guide bush.

The stop device 1 may further comprise a stopping boss 50 arranged in the motor stator assembly 20. In particular, the stopping boss 50 may be located in the receiving groove 22a. More particularly, the stopping boss 50 may be arranged on a wall of the receiving groove 22a on one of the studs 222, and may extend along a direction towards the center of the receiving groove 22a. In some embodiments, the stopping boss 50 may be a square block arranged on one of the studs 222. Of course, in other embodiments, the stopping boss 50 may also be arranged at any other location in the receiving groove 22a. The stopping boss 50 may also be a structure of another shape, such as a cylindrical structure or a U-shaped block structure.

Figure 7:
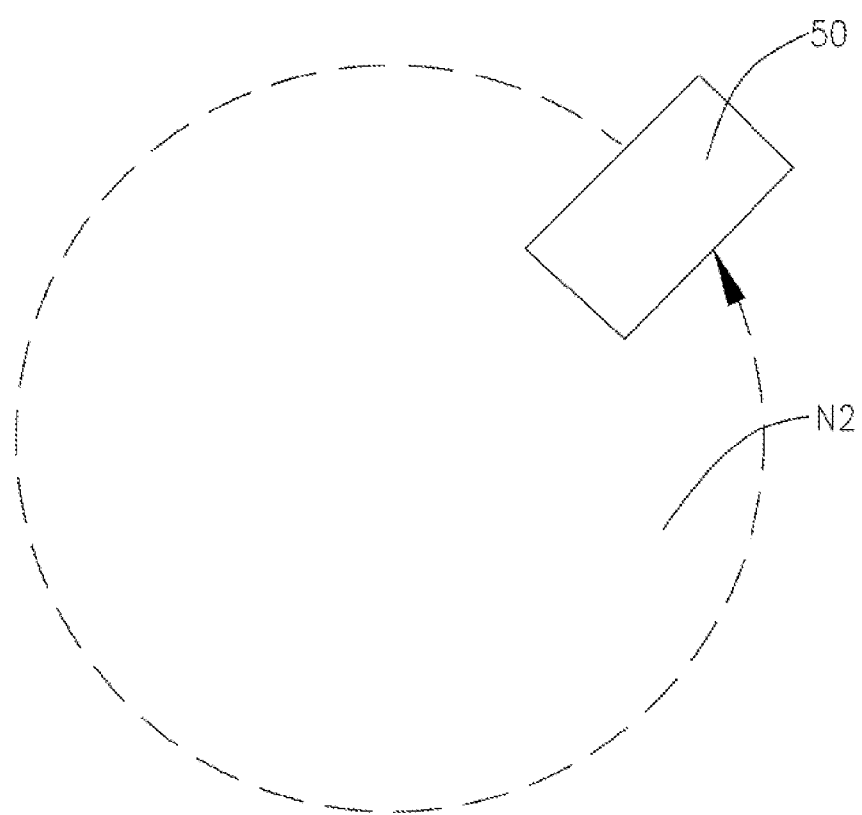
FIG. 7 is a schematic diagram of a second motion trajectory provided by the embodiments of the present disclosure.

The stopping boss 50 may be located on the periphery of the first motion trajectory N1 and may be partially within the second motion trajectory N2 (as shown in FIG. 7). In some embodiments, the second motion trajectory N2 may be an arc trajectory. Of course, in other embodiments, the second motion trajectory N2 can also be a circular trajectory. In particular, during the rotation of the rotating shaft 11, when the first shifting part 32 comes into contact with a first side of the second shifting part 42, both the first shifting part 32 and the second shifting part 42 may rotate along with the rotation of the rotating shaft 11 until the second shifting part 42 comes into contact with the stopping boss 50. At this time, both the first shift lever 30 and the second shift lever 40 may stop rotating with a second side of the second shifting part 42 contacting the stopping boss 50. The second side is opposite to the first side. Then, the first shift lever 30 may change the rotation direction and rotate around the axis of the rotating shaft 11 in an opposite direction (without the second shifting lever 40 rotating along). When the first shifting part 32 comes into contact with the second side of the second shifting part 42, the first shifting part 32 starts to push the second shifting part 42, and hence the second shift lever 40, to rotate together with the first shift lever 30 in that opposite direction, until the first side of the second shifting part 42 comes into contact with the stopping boss 50, at which time both the first shift lever 30 and the second shift lever 40 may stop rotating again. Thus, consistent with the present disclosure, the first shift lever 30 can rotate by an angle greater than 360° and less than 720°.

More specifically, during the rotation of the first shift lever 30 and the second shift lever 40 in the first direction A as driven by the rotation of the rotating shaft 11, when the second shift lever 40 rotates to a position such that the second shifting part 42 is brought into contact with the stopping boss 50, the first shift lever 30 and the second shift lever 40 may stop rotating due to the stopping action of the stopping boss 50. At this time, the second side of the second shifting part 42 contacts the stopping boss 50. Then, the first shift lever 30 may change the rotation direction to rotate in a second direction B opposite to the first direction (without the second shift lever 40 rotating along). When the first shifting part 32 comes into contact with the second side of the second shifting part 42, the first shifting part 32 starts to push the second shifting part 42, and hence the second shift lever 40, to rotate along with the first shift lever 30 in the second direction B, until the first side of the second shifting part 42 of the second shift lever 40 comes into contact with the stopping boss 50, at which time the first shift lever 30 and the second shift lever 40 may be stopped from moving. At this time, the rotating shaft 11 may rotate again in the first direction A to thereby drive the first shift lever 30 and later the second shift lever 40 together to rotate in the first direction A, and such cycle may be repeatedly performed. Reversal rotation of the first shift lever 30 and the second shift lever 40 may be achieved through the reversal rotation of the rotating shaft 11.

In some other embodiments, during the rotation of the rotating shaft 11, when the first shifting part 32 comes into contact with the second side of the second shifting part 42, both the first shifting part 32 and the second shifting part 42 may rotate along with the rotation of the rotating shaft 11 until the second shifting part 42 comes into contact with the stopping boss 50 where the second shift lever 40 may stop rotating with the second side of the second shifting part 42 contacting the stopping boss 50, and the first shifting part 32 may continue to rotate around the axis of the rotating shaft 11 and approach the second shifting part 42 from the first side of the second shifting part 42. When the first shifting part 32 comes into contact with the first side of the second shifting part 42, the rotating shaft 11, the first shift lever 30, and the second shift lever 40 may be stopped from rotating, thereby allowing the first shift lever 30 to rotate by an angle greater than 360° and less than 720°.

More specifically, during the rotation of the first shift lever 30 and the second shift lever 40 in the first direction A as driven by the rotation of the rotating shaft 11, when the second shift lever 40 is rotated such that the second shifting part 42 is brought into contact with the stopping boss 50, the second shift lever 40 may stop rotating due to the stopping action of the stopping boss 50, and the first shift lever 30 may continue to rotate until it comes into contact with the second shift lever 40 and stops rotating. At this time, the rotating shaft 11 may change the rotation direction to rotate in the second direction B to thereby drive the first shift lever 30 and the second shift lever 40 to rotate in the second direction B until the second shifting part 42 of the second shift lever 40 comes into contact with the stopping boss 50 again so that the second shift lever 40 may be stopped from moving with the first side of the second shifting part 42 contacting the stopping boss 50, and the first shift lever 30 may continue to rotate around the axis of the rotating shaft 11 until the first shifting part 32 comes into contact with the second side of the second shift lever 40. At this time, the rotating shaft 11 may change the rotation direction again to rotate in the first direction A to thereby drive the first shift lever 30 and the second shift lever 40 to rotate in the first direction A. Such cycle may be repeatedly performed. Reversal rotation of the first shift lever 30 and the second shift lever 40 may be achieved through the reversal rotation of the rotating shaft 11.

In some embodiments (referring to the angle of view in FIG. 5), the second direction B may be opposite to the first direction A. In particular, the first direction A may be a clockwise direction, and the second direction B may be an anticlockwise direction. Of course, in other embodiments, the first direction A can also be an anticlockwise direction, and the second direction B can also be a clockwise direction.

Furthermore, a distance between the first shifting part 32 and the axis of the rotating shaft 11 may be less than a distance between the stopping boss 50 and the axis of the rotating shaft 11 so that the first shift lever 30 may not be affected by the stopping action of the stopping boss 50, thereby allowing the first shift lever 30 to rotate around the axis of the rotating shaft 11 until the first shift lever 30 is stopped from rotating together with the second shift lever 40 due to the stopping action of the stopping boss 50 in some of the above-described embodiments, or allowing the first shift lever 30 to continue to rotate around the axis of the rotating shaft 11 when the second shift lever 40 is stopped from rotating due to the stopping action of the stopping boss 50 in some of the above-described embodiments. Of course, in other embodiments, the first shift lever 30 may also be made to be free of the stopping action of the stopping boss 50 by defining the relationship between a height of the stopping boss 50 in the receiving groove 22a and a height of the first shifting part 32.

Furthermore, a distance between the second shifting part 42 and the axis of the rotating shaft 11 may be greater than the distance between the stopping boss 50 and the axis of the rotating shaft 11 so that the motion position of the second shift lever 40 may be constrained by the stopping action of the stopping boss 50 during the movement of the second shift lever 40. Of course, in other embodiments, the relationship in height between the second shifting part 42 and the stopping boss 50 may likewise be defined to achieve the stopping effect in these embodiments.

The stop device 1 may further comprise a locking nut 70 arranged on the rotating shaft 11. In particular, the locking nut 70 may be threadedly connected with the third connecting part 11c, and configured to provide an axial pre-tightening force to prevent the second shift lever 40 from slipping off from the first shift lever 30. Moreover, the locking nut 70 may be further configured to provide a pre-tightening force so as to fixedly connect the motor stator assembly 20 with the motor rotor assembly 10.

The stop device 1 may further comprise a wiring box 80 arranged on the motor rotor assembly 10. In particular, the wiring box 80 may be received in the receiving cavity 12a of the housing 12. Flexible printed circuit board (FPC) wiring 81 may be arranged in the wiring box 80, with one end thereof being wound on the rotating shaft 11. Furthermore, one end of the FPC wiring 81 may be wound on the first connecting part 11a. When the motor rotor assembly 10 rotates in the first direction A, the FPC wiring 81 may bring the rotating shaft 11 into rotation. Because the first shift lever 30 and the second shift lever 40 rotate to come into contact with the stopping boss 50, the second shift lever 40 may be stopped from rotating further by the stopping boss 50. The rotating shaft 11 may rotate in the second direction B to drive the first shift lever 30 to rotate in the second direction B, thus avoiding the FPC wiring 81 from being damaged due to rotation by multiple revolutions in the same direction to thereby extend the service life of the FPC wiring 81.

Figure 8:
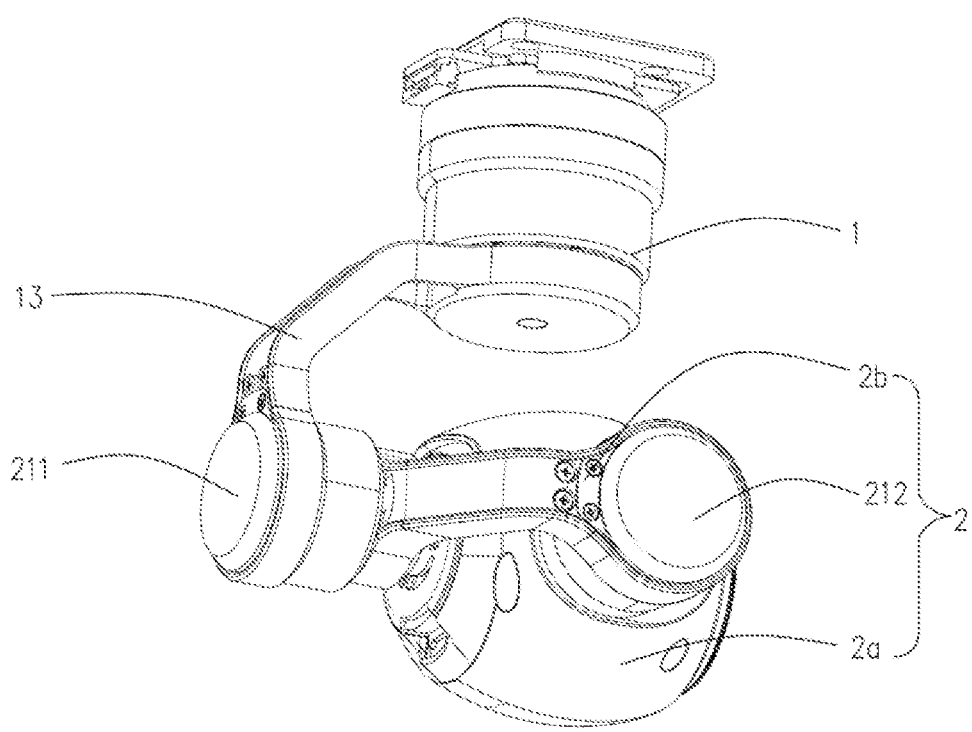
FIG. 8 is a schematic diagram of a payload provided by the present disclosure.

Referring to FIG. 8, the payload 2 may be rotatably connected to the stop device 1, and the stop device 1 may drive the payload 2 to rotate. In some embodiments, the payload 2 may be a camera assembly. Of course, in other embodiments, the payload 2 may also be a micro-computer, a projector, or the like. In particular, the payload 2 may comprise a camera 2a and a connecting rod 2b, wherein a first rotating shaft 211 and a second rotating shaft 212 may be arranged on the camera 2a, and both ends of the connecting rod 2b may be rotatably connected to the first rotating shaft 211 and the second rotating shaft 212, respectively. When the connecting rod 2b is rotated, it may drive the camera 2a to rotate. One end of the rotating rod 13 far from the housing 12 may be rotatably connected to the first rotating shaft 211 so that the rotating rod 13 may drive a rotation of the first rotating shaft 211 when the motor rotor assembly 10 rotates, thereby driving the rotation of the camera 2a.

Furthermore, when the aerial vehicle 100 is used for aerial photography equipment, the rotating shaft 11 may drive the first shift lever 30 to rotate in the first direction A so that the rotating rod 13 may drive the payload to rotate. When the second shift lever 40 is brought into contact with the stopping boss 50 by the rotation of the first shift lever 30 and the second shift lever 40, the second shift lever 40 may stop rotating, and the first shift lever 30 may continue to rotate around the axis of the rotating shaft 11 until it comes into contact with the second shift lever 40, thus stopping the rotation of the rotating shaft 11 and the first shift lever 30. At this time, the payload 2 may stop rotating so that when the first shift lever 30 rotates by a total angle greater than 360° and less than 720°, the camera 2a may be driven by the rotating rod 13 to also rotate by a total angle greater than 360° and less than 720°, thereby obtaining a wider shooting angle of the camera 2a. Moreover, as the first shift lever 30 rotates in the first direction A by at least one revolution during its rotation, the shooting direction of the camera 2a may be in the same direction to avoid repeated shooting of a scene caused by the returning of the camera 2a in a reverse direction after rotating by one revolution, thereby allowing the scene to be shot more completely by the camera 2a.

The stop device according to the present disclosure may be provided with the rotating shaft, the first shift lever and the second shift lever to drive the rotation of the first shift lever and the second shift lever by the rotating shaft, and may be provided with the stopping boss so that the rotation of the second shift lever may be stopped due to the stopping action of the stopping boss, while the first shift lever may continue to rotate until it comes into contact with the second shift lever and stops rotating, thereby allowing the first shift lever to rotate by an angle greater than 360° and less than 720°.

The foregoing disclosure is merely illustrative of the exemplary embodiments of the disclosure, and it shall be noted that those ordinarily skilled in the art can also make a number of modifications and variations without departing from the principle of the disclosure, and these modifications and variations shall also be regarded as falling into the scope of the present disclosure.

What is claimed is:

1. A stop device, comprising:
a motor rotor assembly including a rotating shaft;
a first shift lever fixedly connected to the rotating shaft, the first shift lever comprising a first shifting part configured to rotate around an axis of the rotating shaft to form a first motion trajectory;
a second shift lever rotatably connected to the first shift lever, the second shift lever comprising a second shifting part partially within the first motion trajectory, and the first shifting part being configured to drive the second shifting part to rotate around the axis of the rotating shaft to form a second motion trajectory; and
a motor stator assembly sleeved on the rotating shaft and rotatably connected with the rotating shaft, the motor stator assembly comprising a stopping boss located on a periphery of the first motion trajectory and partially within the second motion trajectory,
wherein the second shift lever is configured to rotate to drive the second shifting part to contact a first side of the stopping boss when rotating in a first direction and to contact a second side of the stopping boss when rotating in a second direction opposite to the first direction, the first side of the stopping boss and the second side of the stopping boss facing away from each other.

2. The stop device according to claim 1, wherein the first shift lever is configured to rotate for a total rotation angle greater than 360° and less than 720°.

3. The stop device according to claim 1, wherein the rotating shaft is configured to:
drive the first shift lever and the second shift lever to rotate in the first direction until the second shifting part is brought into contact with the stopping boss,
drive the first shift lever to rotate in the second direction until the first shifting part is brought into contact with the second shifting part, and
drive, after the first shifting part is brought into contact with the second shifting part, the first shift lever and the second shift lever to rotate in the second direction.

4. The stop device according to claim 1, wherein the rotating shaft is configured to:
drive the first shift lever and the second shift lever to rotate in the first direction until the second shifting part is brought into contact with the stopping boss,
drive the first shift lever to continue to rotate in the first direction until the first shifting part comes into contact with the second shifting part, and
rotate in the second direction to drive the first shift lever and the second shift lever to rotate in the second direction.

5. The stop device according to claim 1, wherein the motor stator assembly comprises a receiving groove and the rotating shaft passes through the receiving groove, and each of the first shift lever, the second shift lever and the stopping boss is located within the receiving groove.

6. The stop device according to claim 4, wherein a distance between the first shifting part and the axis of the rotating shaft is less than a distance between the stopping boss and the axis of the rotating shaft, and a distance between the second shifting part and the axis of the rotating shaft is greater than the distance between the stopping boss and the axis of the rotating shaft.

7. The stop device according to claim 1, wherein the motor rotor assembly comprises a housing, and the rotating shaft is arranged at a center of the housing.

8. The stop device according to claim 7, wherein:
the rotating shaft comprises a first connecting part arranged at the center of the housing and a second connecting part arranged on the first connecting part, the second connecting part including a first rotation stopping position,
the first shift lever comprises a first rotating part arranged on the second connecting part, the first rotating part including a second rotation stopping position, and
the first rotation stopping position and the second rotation stopping position fit with each other to restrict the first rotating part from rotating relative to the rotating shaft.

9. The stop device according to claim 8, wherein the first rotation stopping position is a first tangential section arranged on the second connecting part, and the second rotation stopping position is a second tangential section arranged on the first rotating part.

10. The stop device according to claim 8, further comprising:
a locking nut,
wherein the rotating shaft further comprises a third connecting part on which the locking nut is threadedly connected.

11. The stop device according to claim 1, further comprising:
a sleeve member connected between the first shift lever and the second shift lever to reduce a rotational friction between the first shift lever and the second shift lever.

12. The stop device according to claim 11, wherein the sleeve member is a copper sleeve, and the sleeve member is fixedly arranged on the rotating shaft, wherein an end face of the sleeve member is against an end face of a rotating part of the first shift lever, and the second shift lever is sleeved on a periphery of the sleeve member and is configured to rotate relative to the sleeve member.

13. An aerial vehicle, comprising:
a stop device including:
a motor rotor assembly including a rotating shaft;
a first shift lever fixedly connected to the rotating shaft, the first shift lever comprising a first shifting part configured to rotate around an axis of the rotating shaft to form a first motion trajectory;
a second shift lever rotatably connected to the first shift lever, the second shift lever comprising a second shifting part partially within the first motion trajectory, and the first shifting part being configured to drive the second shifting part to rotate around the axis of the rotating shaft to form a second motion trajectory; and
a motor stator assembly sleeved on the rotating shaft and rotatably connected with the rotating shaft, the motor stator assembly comprising a stopping boss located on a periphery of the first motion trajectory and partially within the second motion trajectory; and
a payload rotatably connected with the stop device,
wherein:
the second shift lever is configured to rotate to drive the second shifting part to contact a first side of the stopping boss when rotating in a first direction and to contact a second side of the stopping boss when rotating in a second direction opposite to the first direction, the first side of the stopping boss and the second side of the stopping boss facing away from each other, and
the stop device is configured to drive the payload to rotate.

14. The aerial vehicle according to claim 13, wherein the first shift lever is configured to rotate for a total rotation angle greater than 360° and less than 720°.

15. The aerial vehicle according to claim 13, wherein the payload is a camera assembly.

* * * * *